(12) United States Patent
Lee et al.

(10) Patent No.: US 8,197,563 B2
(45) Date of Patent: Jun. 12, 2012

(54) FUEL REFORMER

(75) Inventors: Doo-hwan Lee, Yongin-si (KR);
Hyun-chul Lee, Yongin-si (KR);
Kang-hao Lee, Yongin-si (KR)

(73) Assignees: Samsung Electronics Co., Ltd.,
Suwon-si, Gyeonggi-do (KR); **Samsung
SDI Co., Ltd.**, Suwon-si, Gyeonggi-do
(KR)

( * ) Notice: Subject to any disclaimer, the term of this
patent is extended or adjusted under 35
U.S.C. 154(b) by 491 days.

(21) Appl. No.: 12/465,889

(22) Filed: May 14, 2009

(65) Prior Publication Data

US 2010/0126070 A1 May 27, 2010

(30) Foreign Application Priority Data

Nov. 25, 2008 (KR) .................... 10-2008-117481

(51) Int. Cl.
*B01J 7/00* (2006.01)
*B01J 8/00* (2006.01)
*C01B 3/36* (2006.01)
*C01B 6/24* (2006.01)
*C01B 3/24* (2006.01)
*C01B 3/26* (2006.01)

(52) U.S. Cl. ........... 48/61; 48/197 R; 423/644; 423/650;
423/651; 422/625; 422/629

(58) Field of Classification Search .......... 48/61, 197 R;
422/625–629; 423/644–658
See application file for complete search history.

(56) References Cited

U.S. PATENT DOCUMENTS

| 4,793,800 A | * | 12/1988 | Vallett et al. .................. 431/328 |
| 2002/0131919 A1 | * | 9/2002 | DeBellis et al. .............. 422/188 |
| 2006/0112637 A1 | * | 6/2006 | An et al. ........................... 48/61 |
| 2007/0113476 A1 | * | 5/2007 | Thomas et al. ............. 48/198.7 |

FOREIGN PATENT DOCUMENTS

| JP | 08-217401 | 8/1996 |
| JP | 08-270887 | 10/1996 |
| JP | 09-002801 | 1/1997 |
| JP | 10-218602 | 8/1998 |
| JP | 2000-026101 | 1/2000 |
| JP | 2003-148709 | 5/2003 |
| JP | 2004-288434 | 10/2004 |

* cited by examiner

*Primary Examiner* — Matthew Merkling
(74) *Attorney, Agent, or Firm* — Lee & Morse, P.C.

(57) ABSTRACT

A fuel reformer, includes: a reformer burner, which generates a flame in a reforming pipe disposed to surround at least the flame of the reformer burner, the reforming pipe being filled with a reforming catalyst and having corrugated portions on a surface facing the reformer burner and a bottom surface of the reforming pipe disposed adjacent to the flame in which a flame blocking member is disposed between the flame of the reformer burner and the reforming pipe to isolate the flame of the reformer burner from the reforming pipe.

10 Claims, 6 Drawing Sheets

FUEL REFORMER

CROSS-REFERENCE TO RELATED APPLICATIONS

This application claims the benefit of Korean Patent Application No. 2008-117481, filed on Nov. 25, 2008, in the Korean Intellectual Property Office, the disclosure of which is incorporated herein by reference.

BACKGROUND

1. Field

Exemplary embodiments relate to a fuel reformer included in a fuel processor, and more particularly, to a fuel reformer which includes a reformer flame blocking member and a reforming pipe having corrugations that contribute to improving the durability and operating reliability of a fuel cell system.

2. Description of the Related Art

A fuel cell system is a power generation system that directly converts the chemical energy of hydrogen and oxygen contained in a hydrocarbon-based material, such as methanol, ethanol, or natural gas, into electric energy. A fuel cell system using hydrogen gas includes a fuel cell stack and a fuel processor. The fuel cell stack has a structure in which several to tens of unit cells, each including a membrane electrode assembly (MEA) and a separator, are stacked.

FIG. 1 is a schematic block diagram of a fuel cell system. Referring to FIG. 1, a fuel, containing hydrogen, is reformed to hydrogen gas in a fuel processor, and the hydrogen gas is supplied to a fuel cell stack. The fuel cell stack receives the hydrogen gas, the hydrogen gas and oxygen electrochemically react in the fuel cell stack, and the fuel cell stack generates electric energy therefrom.

The fuel processor includes a desulfurizer and a hydrogen generator, and the hydrogen generator includes a reformer, a shift reactor, and a CO remover. The desulfurizer removes sulfur from the fuel so that a catalyst of the reformer and the shift reactor is not poisoned by a sulfur compound.

The reformer generates hydrogen gas, carbon dioxide, and carbon monoxide from hydrocarbons. However, since the carbon monoxide poisons the catalyst used in an electrode of the fuel cell stack, the hydrogen gas generated in the reformer is supplied to the fuel cell stack after the carbon monoxide is removed from the hydrogen gas through the shift reactor and the CO remover. The hydrogen gas that passes through the shift reactor has an amount of carbon monoxide more than about 10 ppm to hundreds of ppm. The CO remover reduces the amount of the carbon monoxide from the hydrogen gas that passed through the shift reactor to less than 10 ppm.

FIG. 2 is a schematic cross-sectional view of a fuel reformer 10. Referring to FIG. 2, the fuel reformer 10 includes a burner 15 which forms a flame 25 in a combustion chamber 11 inside a reforming pipe 22 including a reforming catalyst layer 20. If a combustion fuel, which is a mixture of gas of methane ($CH_4$) and air, is ignited when the combustion fuel is ejected to the combustion chamber 11 via the burner 15, the flame 25 is generated in the combustion chamber 11, and the reforming catalyst layer 20 is heated, thereby generating a hydrogen generation reaction.

Also, since the fuel reformer 10 is operated at a high temperature, the burner 15 is used to supply heat necessary for the hydrogen generation reaction with combustion heat of the fuel in order to increase the temperature of the fuel reformer 10. However, if heat is directly supplied to the chamber 11, the flame 25 directly touches the reforming pipe 22, and the reforming catalyst 20 may be locally overheated. Also, the flame 25 directly touches a surface of the reforming pipe 22, and thus a hot spot is generated on the reforming pipe 22, which reduces the durability of the fuel reformer 10 due to damage in the material and structure of the fuel reformer 10.

SUMMARY

Exemplary embodiments include a fuel reformer that includes a corrugated reforming pipe to suppress thermal stress at high temperatures, and a flame blocking member that prevents a burner flame from directly touching a surface of a fuel reformer by surrounding the burner flame and isolates the corrugated reforming pipe from the burner.

Additional aspects will be set forth in part in the description which follows and, in part, will be apparent from the description, or may be learned by practice thereof.

Exemplary embodiments provide a fuel reformer including: a reformer burner, which includes an internal space into which combustion fuel flows, to discharge the combustion fuel in the internal space from an outlet of the reformer burner to form a flame; a reforming pipe disposed to surround at least a portion of the flame of the reformer burner, the reforming pipe being filled with a reforming catalyst and having corrugated portions on a surface facing the outlet of the reformer burner and a bottom surface of the reforming pipe adjacent to the flame, respectively; a flame blocking member disposed between the flame of the reformer burner and the reforming pipe to isolate the flame of the reformer burner from the reforming pipe; a combustion fuel supplier to supply the combustion fuel to the internal space of the reformer burner; and a reforming gas supplier to supply reforming gas to the reforming pipe.

Exemplary embodiments provide that the flame blocking member may include a flame distributing portion having a plurality of holes.

Exemplary embodiments provide that the flame distributing portion may be disposed on at least one of a side surface and an upper surface of the flame blocking member.

Exemplary embodiments provide that the fuel reformer further includes a flame distributing portion disposed separately from the flame blocking member and attached to the reforming pipe at a portion thereof opposite the reformer burner.

Exemplary embodiments provide that an aspect ratio of the flame blocking member may be between about 1 and about 20.

Exemplary embodiments provide that the plurality of holes of the flame distributing portion may have diameters between about 0.1 mm and about 10 mm.

Exemplary embodiments provide that the plurality of holes of the flame distributing portion may have the same diameter or at least two different diameters.

Exemplary embodiments provide that the flame blocking member may be formed of ceramic or high temperature stainless steel.

Additional aspects and/or advantages will be set forth in part in the description which follows and, in part, will be obvious from the description, or may be learned by practice thereof.

BRIEF DESCRIPTION OF THE DRAWINGS

These and/or other aspects and advantages will become apparent and more readily appreciated from the following description of exemplary embodiments, taken in conjunction with the accompanying drawings of which.

DETAILED DESCRIPTION

Figure 1:
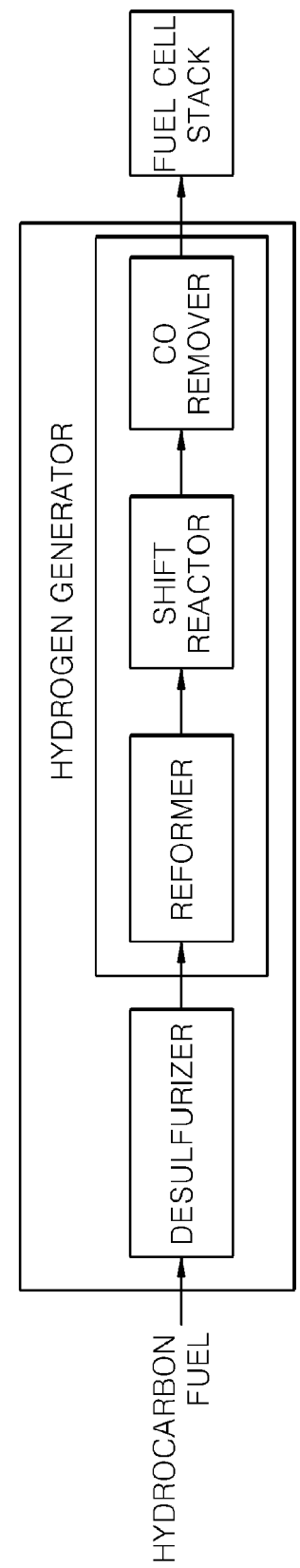
FIG. 1 is a schematic block diagram of a related fuel cell system.
Figure 2:
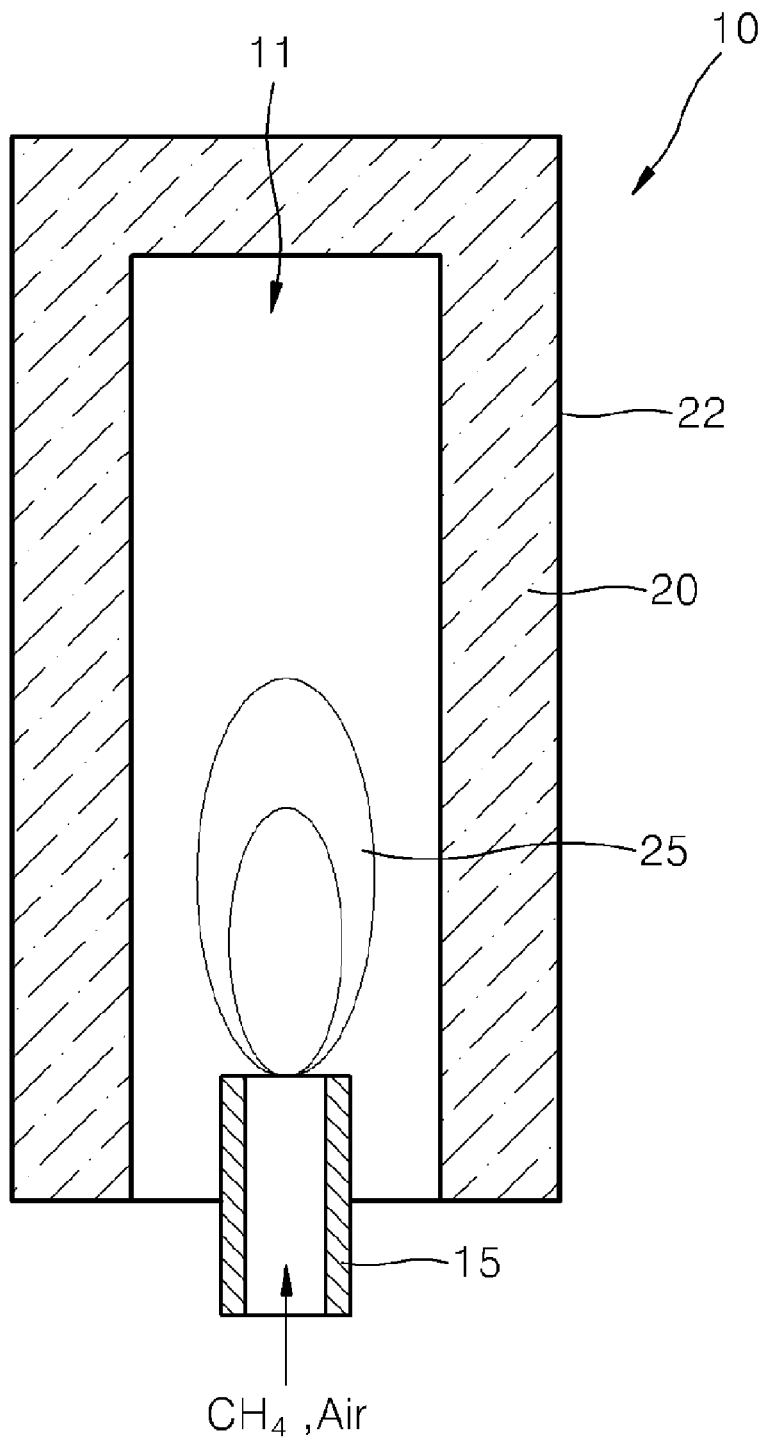
FIG. 2 is a schematic cross-sectional view of a related fuel reformer.

Reference will now be made in detail to exemplary embodiments, examples of which are illustrated in the accompanying drawings, wherein like reference numerals refer to the like elements throughout. Exemplary embodiments are described below in order to explain aspects thereof by referring to the figures.

Figure 3:
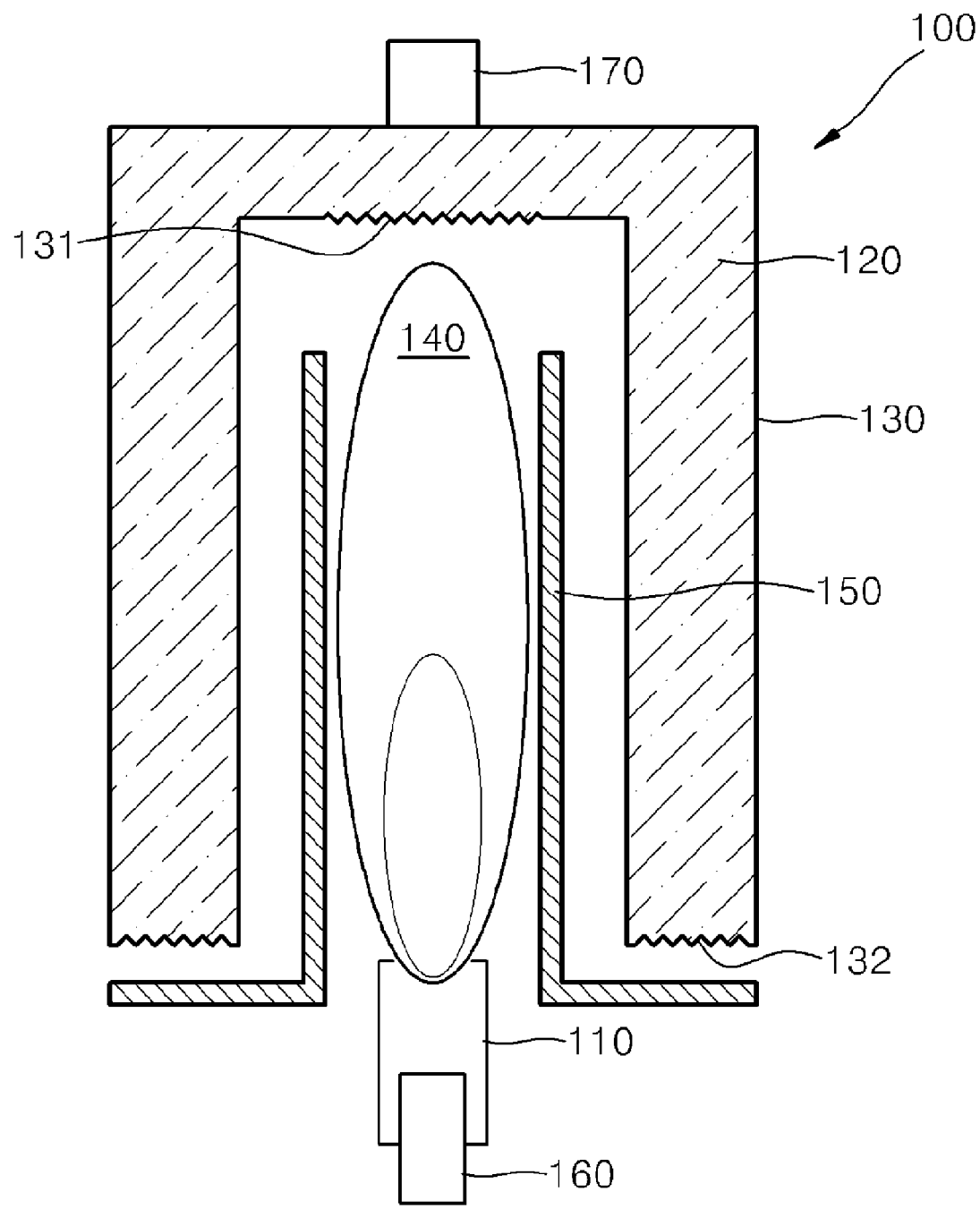
FIG. 3 is a cross-sectional view of a fuel reformer according to exemplary embodiments.

FIG. 3 is a cross-sectional view of a fuel reformer 100 according to exemplary embodiments. Referring to FIG. 3, the fuel reformer 100 includes a reformer burner 110 that discharges combustion fuel into an internal space of the fuel reformer burner 100 and forms a flame 140, and a reforming pipe 130 that surrounds at least a portion of the flame 140 of the reformer burner 110 and is filled with a reforming catalyst 120. A flame blocking member 150 is disposed between the reforming pipe 130 and the flame 140 so as to prevent the flame 140 from directly contacting the reforming pipe 130. A combustion fuel supplier 160 is installed in the reformer burner 110. Also, a reforming gas supplier 170 is installed on the reforming pipe 130 so as to supply reforming gas into the reforming pipe 130.

The reforming pipe 130 may include a zigzagged, wrinkled, or corrugated portion 131 in a surface that the flame 140 directly contacts or is likely to contact the reforming pipe 130, and a zigzagged, wrinkled, or corrugated portion 132 in a lower portion or bottom surface of the reforming pipe 130 adjacent to the flame 140. The corrugated portions 131 and 132 may prevent the fuel reformer 100 from being deformed due to contact with the flame 140.

When the combustion fuel of methane gas ($CH_4$) and air flows into the reformer burner 110 and is ignited, the flame 140 is formed inside the flame blocking member 150.

The reforming pipe 130 includes the corrugated portions 131 and 132 in the surface facing an outlet of the reformer burner 110, i.e, on an area opposite the reformer burner, and the bottom surface of the reforming pipe 130, respectively, so as to prevent structural stress caused by expansion and contraction due to temperature differences during the operation of the reformer burner 110.

The flame blocking member 150 is disposed between the reformer burner 110 and the reforming pipe 130 so as to prevent the flame 140 of the reformer burner 110 from directly contacting internal sides of the reforming pipe 130.

The flame blocking member 150 may be formed of highly thermostable ceramic or high temperature stainless steel.

Figure 4:
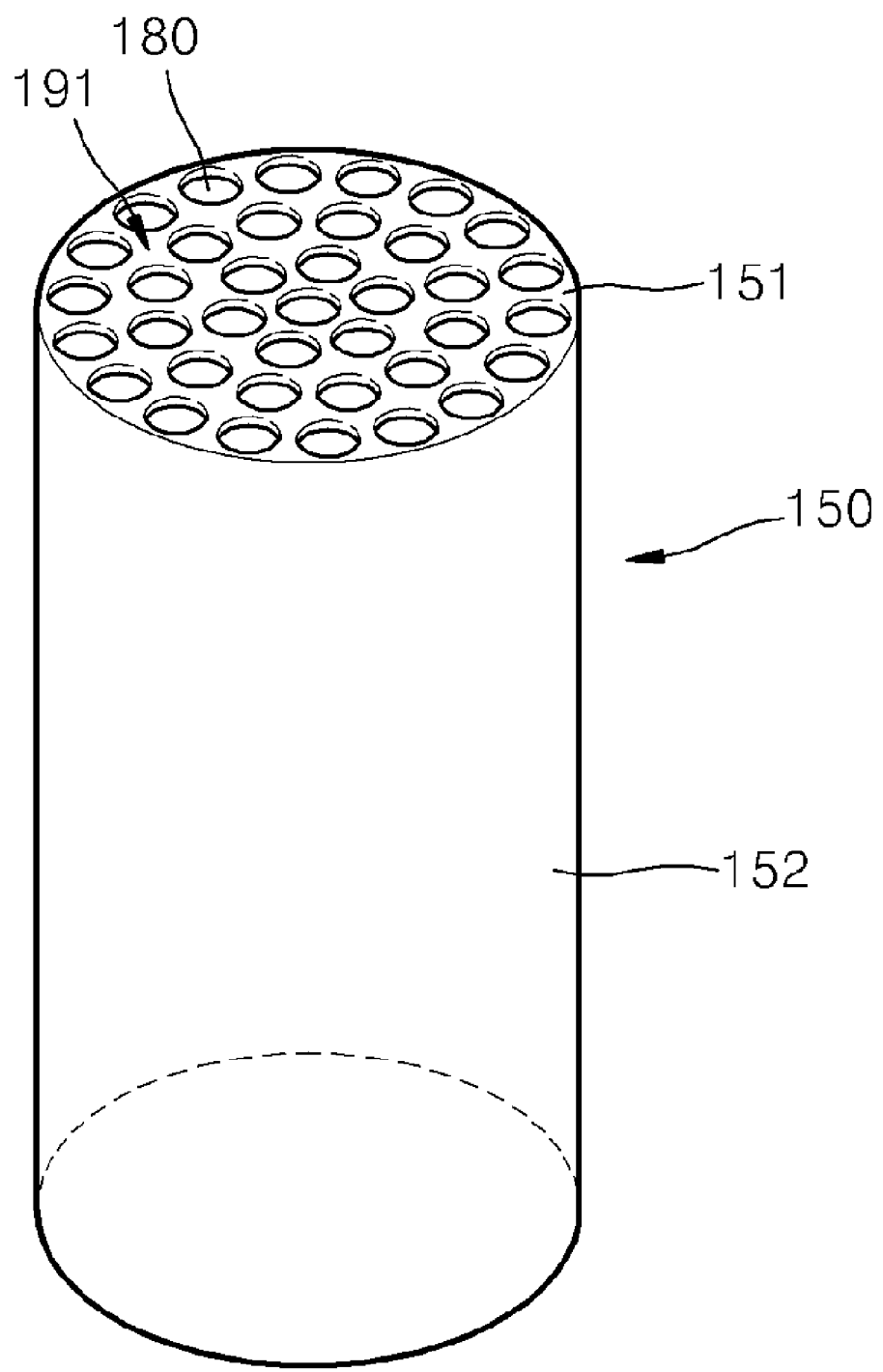
FIGS. 4 and 5 are diagrams illustrating a flame distributing portion of a flame blocking member of FIG. 3 according to exemplary embodiments.
Figure 5:
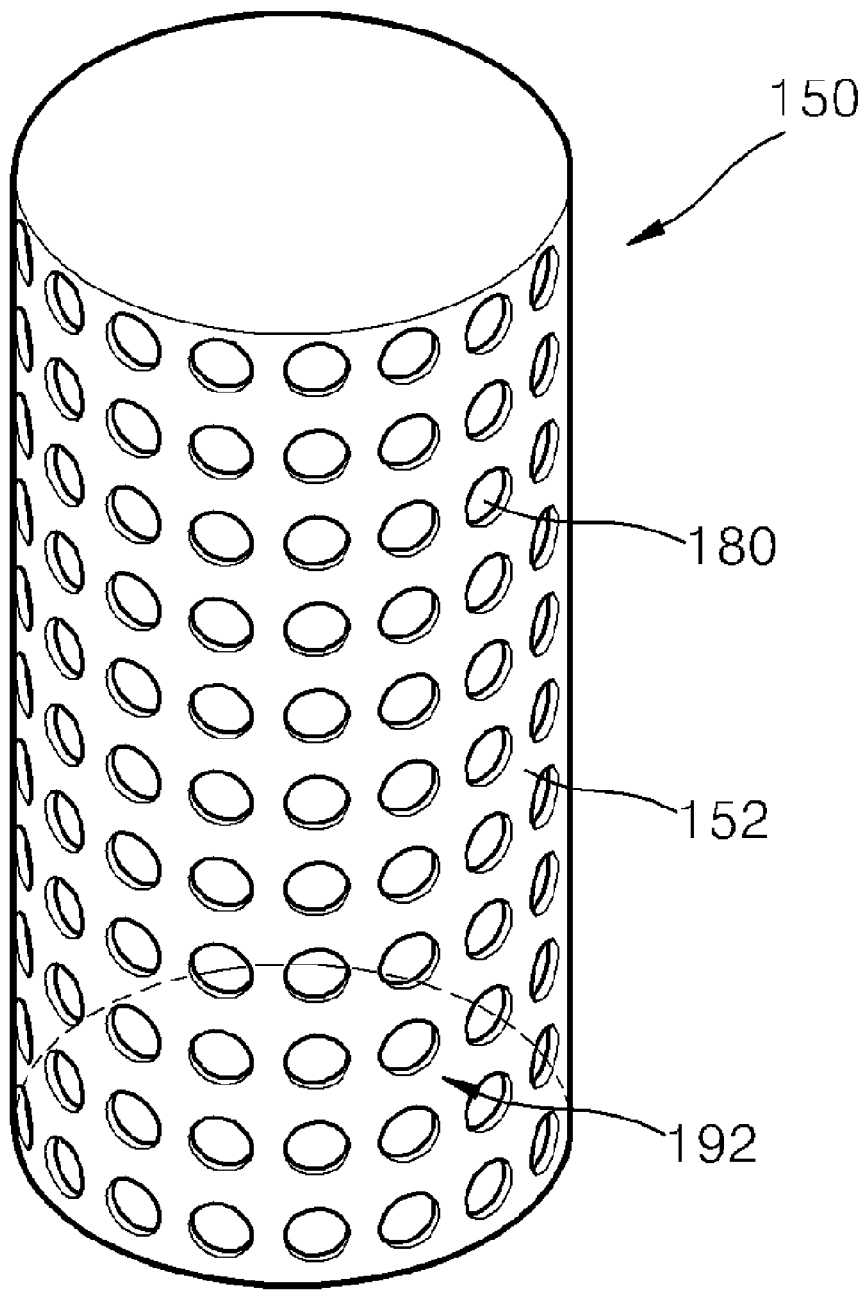

FIGS. 4 and 5 are diagrams illustrating flame distributing portions 191 and 192, respectively, of the flame blocking member 150 illustrated in FIG. 3, according to exemplary embodiments. Referring to FIGS. 4 and 5, the flame distributing portions 191 and 192 include a plurality of holes 180 and may be, but not exclusively, formed on an upper surface 151 or a side surface 152 of the flame blocking member 150, so that heat from the reformer burner 110 is uniformly transmitted to the reforming catalyst 120 of the reforming pipe 130. The holes 180 of the flame distributing portions 191 and 192 eject the flame 140 and/or heat of the burner 110 therethrough in small sizes, i.e., distribute the flame 140 and/or heat of the burner 110 through the flame blocking member 150. Aspects of the exemplary embodiments are not limited thereto such that the flame distributing portions 191 and 192 may both be, but not exclusively, disposed in the flame blocking member 150.

Figure 6:
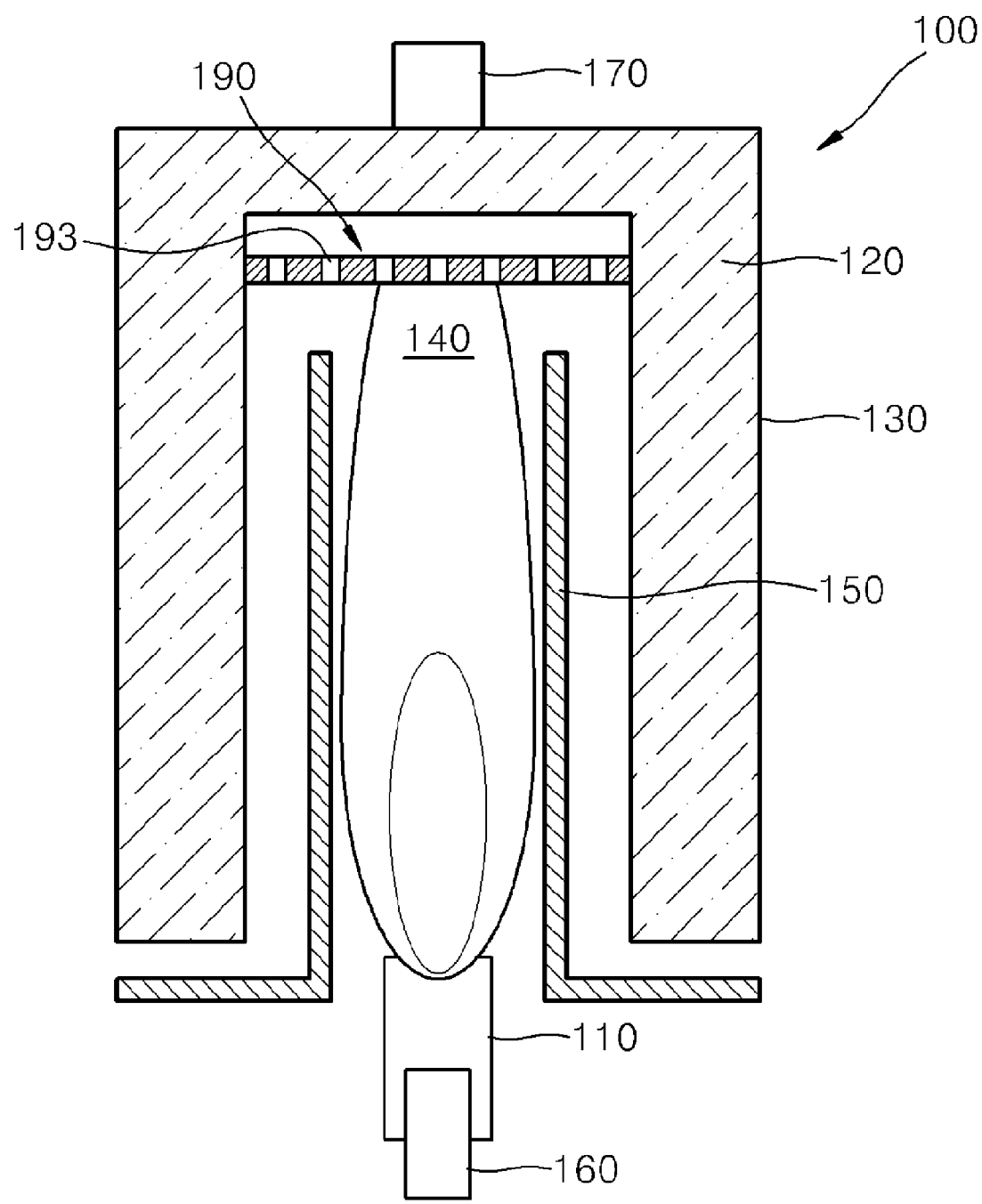
FIG. 6 is a cross-sectional view of a fuel reformer according to exemplary embodiments.

FIG. 6 is a cross-sectional view of the fuel reformer 100 according to exemplary embodiments. Referring to FIG. 6, a flame distributing member 190 may be separated from the flame blocking member 150 and be attached to the reforming pipe 130. A plurality of holes 193 may be formed in the flame distributing member 190 so that the flame 140 and/or heat is dispersed and passes through the flame distributing member 190. The holes 193 of the flame distributing member 190 eject the flame 140 of the burner 110 in small sizes, i.e., distribute the flame 140 and/or heat of the burner 110 through flame distributing member 190.

An aspect ratio (height/diameter) of the flame blocking member 150 may be between about 1 and about 20, and the holes 180 and 193 may have the same diameter or at least two different diameters between about 0.1 mm and about 10 mm.

As described above, the flame blocking member of the fuel reformer blocks a flame of a burner from directly contacting the surface of the fuel reformer, thereby preventing the reforming catalyst from being locally overheated. The flame blocking member of the fuel reformer prevents deformation of a material and structure of the fuel reformer, and minimizes a thermal shock caused by an operation of the reformer burner, thereby increasing efficiency of the fuel reformer and increasing the durability of the fuel reformer. Also, the fuel reformer includes corrugated portions, which provide structural stability to the fuel reformer, so that reliability and durability of the fuel reformer increase.

The fuel reformer according to exemplary embodiments prevents the flame of the reformer burner from directly contacting the surface of the reforming pipe, thereby preventing the reforming catalyst from being overheated. The fuel reformer according to exemplary embodiments includes the corrugated portions, thereby obtaining a structural stability of the fuel reformer.

It should be understood that the exemplary embodiments described herein should be considered in a descriptive sense only and not for purposes of limitation. Descriptions of aspects within each exemplary embodiment should typically be considered as available for other similar aspects in other embodiments.

Although a few exemplary embodiments have been shown and described, it would be appreciated by those skilled in the art that changes may be made in these embodiments without departing from their principles and spirit, the scope of which is defined in the claims and their equivalents.

What is claimed is:

1. A fuel reformer, comprising:
   a reformer burner, which comprises an internal space into which combustion fuel flows, to discharge the combustion fuel in the internal space from an outlet of the reformer burner to form a flame;
   a reforming pipe disposed to surround at least a portion of the flame of the reformer burner, the reforming pipe being filled with a reforming catalyst and comprising corrugated portions only on a surface facing the outlet of the reformer burner and a bottom surface of the reforming pipe disposed adjacent to the flame, respectively;

a flame blocking member disposed between the flame of the reformer burner and the reforming pipe to isolate the flame of the reformer burner from the reforming pipe;

a combustion fuel supplier to supply the combustion fuel to the internal space of the reformer burner; and a reforming gas supplier to supply reforming gas to the reforming pipe.

2. The fuel reformer of claim 1, wherein the flame blocking member comprises a flame distributing portion having a plurality of holes therethrough.

3. The fuel reformer of claim 2, wherein the flame distributing portion is disposed on at least one of a side surface and an upper surface of the flame blocking member.

4. The fuel reformer of claim 1, further comprising a flame distributing member disposed separately from the flame blocking member and attached to the reforming pipe at a portion thereof opposite the reformer burner.

5. The fuel reformer of claim 1, wherein an aspect ratio of the flame blocking member is between about 1 and about 20.

6. The fuel reformer of claim 2, wherein the plurality of holes of the flame distributing portion have diameters between about 0.1 mm and about 10 mm.

7. The fuel reformer of claim 2, wherein the plurality of holes of the flame distributing portion have a same diameter or at least two different diameters.

8. The fuel reformer of claim 1, wherein the flame blocking member is formed of ceramic or high temperature stainless steel.

9. The fuel reformer of claim 4, wherein the plurality of holes of the flame distributing member have diameters between about 0.1 mm and about 10 mm.

10. The fuel reformer of claim 4, wherein the plurality of holes of the flame distributing member have a same diameter or at least two different diameters.

* * * * *